(12) United States Patent
Cohen et al.

(10) Patent No.: US 11,555,907 B2
(45) Date of Patent: *Jan. 17, 2023

(54) SATELLITE ORBITAL MONITORING AND DETECTION SYSTEM USING FRACTAL SUPERSCATTERER SATELLITE REFLECTORS (FSR)

(71) Applicant: Fractal Antenna Systems, Inc., Bedford, MA (US)

(72) Inventors: Nathan Cohen, Belmont, MA (US); Alexander Shelman-Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,071

(22) Filed: Feb. 15, 2022

(65) Prior Publication Data

US 2022/0244369 A1  Aug. 4, 2022

Related U.S. Application Data

(63) Continuation of application No. 16/733,116, filed on Jan. 2, 2020, now Pat. No. 11,249,178.

(60) Provisional application No. 62/920,130, filed on Apr. 13, 2019, provisional application No. 62/787,575, filed on Jan. 2, 2019.

(51) Int. Cl.
  *G01S 13/06* (2006.01)
  *H01Q 15/00* (2006.01)
  *G01S 13/75* (2006.01)
  *B64G 3/00* (2006.01)
  *B64G 1/22* (2006.01)

(52) U.S. Cl.
  CPC .............. *G01S 13/06* (2013.01); *B64G 1/226* (2013.01); *B64G 3/00* (2013.01); *G01S 13/753* (2013.01); *H01Q 15/0086* (2013.01); *H01Q 15/0093* (2013.01); *G01S 13/758* (2013.01)

(58) Field of Classification Search
  CPC ...... G01S 13/06; G01S 13/753; G01S 13/758; B64G 3/00; H01Q 15/0086; H01Q 15/0093
  USPC .......................................................... 342/5
  See application file for complete search history.

(56) References Cited

U.S. PATENT DOCUMENTS 2,956,117 A * 10/1960 Ernst ....................... B61L 25/04
                                                    348/148
3,247,509 A *  4/1966 Hamann ................. B61L 25/04
                                                     342/44

(Continued)

FOREIGN PATENT DOCUMENTS

WO    WO 2014/055573 A1    4/2014

OTHER PUBLICATIONS

EP-2904887-A1, Cohen N, Aug. 2015 (Year: 2015).*

(Continued)

*Primary Examiner* — Bernarr E Gregory
*Assistant Examiner* — Nuzhat Pervin
(74) *Attorney, Agent, or Firm* — Daly, Crowley, Mofford & Durkee, LLP

(57) ABSTRACT

Metamaterials are described which can be employed with satellites, e.g., small sats, to increase the observability of such satellites. Any type of suitable metamaterial can be used. In exemplary embodiments fractal-based patterns or structures may be used.

16 Claims, 4 Drawing Sheets

(56) References Cited

U.S. PATENT DOCUMENTS

| | | | | |
|---|---|---|---|---|
| 3,247,514 | A | * | 4/1966 | Hamann .................. B61L 25/04 342/6 |
| 3,858,203 | A | * | 12/1974 | Constant .................. G06K 7/10 356/28 |
| 4,117,485 | A | * | 9/1978 | Gorr .......................... G01S 7/38 342/6 |
| 4,684,952 | A | * | 8/1987 | Munson ............... H01Q 21/065 342/368 |
| 4,823,131 | A | | 4/1989 | Bell |
| 5,307,068 | A | * | 4/1994 | Hartemann ............. H01L 39/14 342/6 |
| 6,264,143 | B1 | * | 7/2001 | Massonnet ............ G01S 13/003 342/354 |
| 9,134,465 | B1 | * | 9/2015 | Cohen ....................... F41H 3/00 |
| 9,166,302 | B2 | * | 10/2015 | Cohen .................. H01Q 21/205 |
| 9,482,474 | B2 | * | 11/2016 | Cohen ....................... F41H 3/00 |
| 9,677,824 | B2 | * | 6/2017 | Cohen .................... G02B 5/008 |
| 9,847,583 | B1 | * | 12/2017 | Cohen .................... H01Q 17/00 |
| 9,967,011 | B1 | * | 5/2018 | Lipworth ................. H01Q 3/44 |
| 10,075,219 | B1 | * | 9/2018 | Lipworth ................ H04B 7/046 |
| 10,340,599 | B2 | * | 7/2019 | Tayfeh Aligodarz ........................ H01Q 15/0066 |
| 10,361,487 | B2 | * | 7/2019 | Rashidian ................. G03F 7/40 |
| 10,415,896 | B2 | | 9/2019 | Cohen |
| 11,249,178 | B2 | | 2/2022 | Cohen |
| 2010/0156556 | A1 | | 6/2010 | Cohen |
| 2011/0050360 | A1 | * | 3/2011 | Cohen .................. H01Q 21/205 333/135 |
| 2013/0222202 | A1 | * | 8/2013 | Lam ..................... H01Q 9/0428 343/836 |
| 2014/0090828 | A1 | * | 4/2014 | Cohen ....................... F28F 7/00 165/185 |
| 2014/0235456 | A1 | * | 8/2014 | Garner, Jr. ............. G16B 35/00 702/19 |
| 2014/0327597 | A1 | * | 11/2014 | Rashidian ............ H01Q 9/0485 343/905 |
| 2015/0303581 | A1 | * | 10/2015 | Bodo .................... G01S 13/426 342/7 |
| 2015/0380824 | A1 | * | 12/2015 | Tayfeh Aligodarz ........................ H01Q 15/0086 430/319 |
| 2016/0112117 | A1 | * | 4/2016 | Platzer .................. H04W 24/02 370/316 |
| 2017/0003086 | A1 | * | 1/2017 | Cohen .................. H01Q 17/008 |
| 2017/0038160 | A1 | * | 2/2017 | Cohen ....................... F41H 3/00 |
| 2017/0111024 | A1 | * | 4/2017 | Nathan ................ H01Q 17/008 |
| 2017/0205502 | A1 | * | 7/2017 | Honma .................... G01S 13/46 |
| 2017/0254903 | A1 | * | 9/2017 | Johnson ..................... G01S 3/42 |
| 2017/0264022 | A1 | * | 9/2017 | Mroczek ................ H01Q 15/14 |
| 2017/0272149 | A1 | * | 9/2017 | Michaels .............. G01S 5/0081 |
| 2019/0386364 | A1 | * | 12/2019 | Liang .................. H01Q 15/0086 |
| 2019/0392275 | A1 | * | 12/2019 | Filonov ................ H04B 5/0062 |

OTHER PUBLICATIONS

U.S. Non-Final Office Action dated Mar. 3, 2021 for U.S. Appl. No. 16/733,116; 17 pages.

Response to U.S. Non-Final Office Action dated Mar. 3, 2021 for U.S. Appl. No. 16/733,116; Response filed on Aug. 2, 2021; 10 pages.

U.S. Notice of Allowance dated Oct. 19, 2021 for U.S. Appl. No. 16/733,116; 21 pages.

* cited by examiner (A)

SMALL SAT
W/O RADAR RETURN
NO FRACTAL
SUPERSCATTERER
REFLECTOR (FSR)

(B)

SMALL SAT
W/ RADAR RETURN
FROM ADDED FSR

SATELLITE ORBITAL MONITORING AND DETECTION SYSTEM USING FRACTAL SUPERSCATTERER SATELLITE REFLECTORS (FSR)

CROSS-REFERENCE TO RELATED APPLICATIONS

This application is a continuation of U.S. patent application Ser. No. 16/733,116, entitled "Satellite Orbital Monitoring and Detection System Using Fractal Superscatterer Satellite Reflectors (SRS)," filed 2 Jan. 2020, which is based upon and claims priority to (i) U.S. Provisional Patent Application No. 62/787,575, entitled "Satellite Orbital Monitoring and Detection System Using Fractal Superscatterer Satellite Reflectors (SRS)," filed 2 Jan. 2019, and (ii) U.S. Provisional Patent Application No. 62/920,130, entitled "Solar Cells, Satellites, and Surfaces with Radar Enhanced Metamaterial Reflectors," filed 13 Apr. 2019; the entire content of each of which applications is incorporated herein by reference.

BACKGROUND

Small satellites have become increasingly used for communications and sensor networks. Such small satellites are often called "cubesats" or "microstats". Such small satellites are often of an approximate volume of that of a human fist, or smaller. The principal benefit of such small satellites (for convenience, as used herein tiny or small satellites are referred to as "small sats") is their advantageous functionality in a size and weight that is relatively inexpensive for the achievement of Earth orbit. Thus small sats leverage dramatic advances in the last 30 years in microelectronics to provide great functionality in a very small package. Examples where small sats are used include (but are not limited to) sensors for space missions, telecommunications and telecommunication networks, and various monitoring tasks of the circum-terrestrial environment.

The number of small sats that have achieved orbit in the last 10 years has gone up dramatically, concurrent with the desire for the noted sensor and telecommunication purposes. In doing so, these small sats have created a problem, i.e., the ability to detect and monitor the orbits of these small sats.

Such monitoring is commonly done through, e.g., the U.S. space command, and/or other equivalent radar-based (for example) Earth installations in other countries. For such monitoring, typically a radar signal bounces off the satellite, which at a receiving station establishes the satellite's distance, speed, size, and orbital parameters of the satellite, along with its existence of the satellite itself.

Enhancement of the radar signature satellites has previously been considered. For example, U.S. Pat. No. 4,823,131 describes use of a corner reflector in order to enhance the radar reflection from satellite. A different technique is described in U.S. Patent Application Publication number 2017/0264022A1, in which a Van Atta array is employed to increase the radar cross-section. A Van Atta array is a collection of phased feed connected elements, typically a half wave in size and separation, whereby an incident radar reflection is received and retransmitted passively by the array.

For application to small satellites, the use of either or both of these noted techniques is problematic because of the limited amount of surface area available on the satellite. In the case of a corner reflector, the three-dimensional structure may be a substantial fraction of a wavelength or more, thereby requiring a structure which is either separate from the satellite or larger than the satellite itself.

Again, in the case of a small satellite employing a Van Atta array, there is typically insufficient surface area on most small satellites to incorporate a minimum sized array to accommodate the Van Atta approach. For sake of illustration, most radar of satellites communicate at S band frequencies, with typical wavelengths of approximately 13 cm. It will be appreciated that in small satellites, such as a cube set, a viable Van Atta array would lack a sufficient number of elements in order to accommodate viable or sufficient radar reflection.

Although it is appreciated that these techniques are available to increase the radar cross-section of a small satellite, they are practically unacceptable or unfavorable because the minimum area they require in order to work well is larger than the area available on the side of such a satellite.

SUMMARY

In accordance with embodiments of the present disclosure, metamaterials can be employed with satellites, e.g., small sats, to increase the observability of such satellites. Any type of suitable metamaterial can be used. In exemplary embodiments fractal-based patterns or structures may be used.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all or some of the components or steps that are illustrated or described. When the same numeral appears in different drawings, it refers to the same or like components or steps.

DETAILED DESCRIPTION OF ILLUSTRATED EMBODIMENTS

Figure 1:
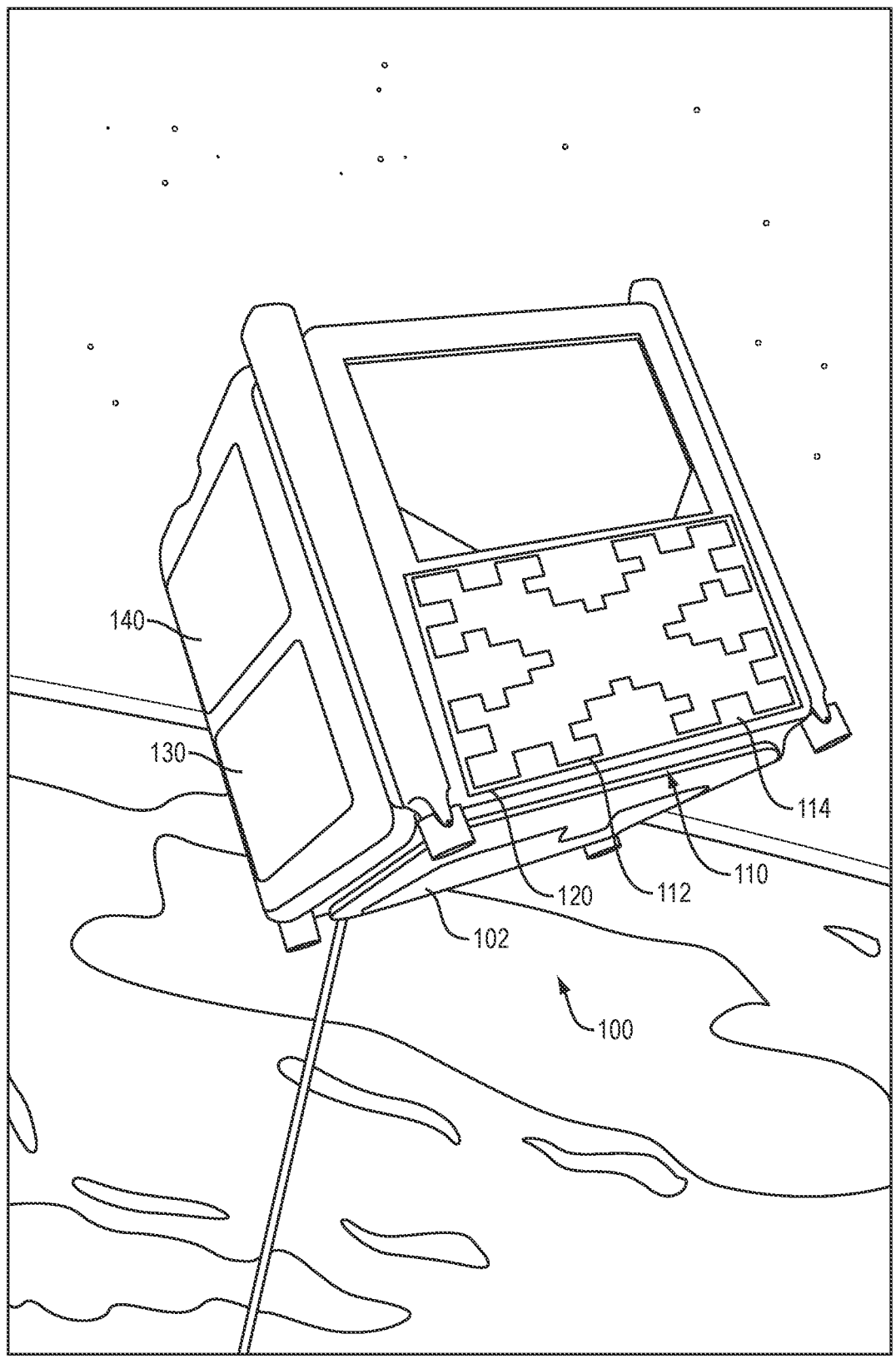
FIG. 1 depicts an embodiment of a small sat employing a fractal superscatter reflector ("FSR") in accordance with the present disclosure.

Illustrative embodiments are now described. Other embodiments may be used in addition or instead. Details that may be apparent or unnecessary may be omitted to save space or for a more effective presentation. Some embodiments may be practiced with additional components or steps and/or without all or some of the components or steps that are described.

Enhanced Detection:

An aspect of the present disclosure is directed to a novel system for detecting satellites, including but not limited to, tiny satellites that are often called "cubesats" or microsatellite "microsats. A super scatterer having a metasurface, e.g., of a fractal meta-surface, is employed for the satellite and enhances the radar reflection for a given area of the satellite, which is especially useful for a small satellite with limited area. Such detection can be used for monitoring and/or controlling the orbits of satellite space craft.

Embodiments of the present disclosure can be used to provide the important enhanced ability to determine the location of satellites in orbit about the Earth, particularly small sats, in order to prevent space conflicts, and/or damage of space-based assets as well as to monitor the placement and lifetime of the satellites themselves. Embodiments of the present disclosure can thus meet the need to have a radar reflecting system that enhances the radar reflection of a small satellite, or other satellite, while avoiding the need to increase the size of such a satellite.

Exemplary embodiments of the present disclosure utilize a metasurface, metastructure, and/or metamaterial to provide increased or enhanced radar cross section (RCS) for satellites, particularly small-sized satellites ("small sats"). Embodiments of the present disclosure include and/or provide for (i) these patterns or structures on satellites; (ii) satellites so equipped with these patterns or structures; and, (iii) detection and monitoring systems/methods, such as radar-based ones, which utilize these metamaterial patterns or structures as reflector-based sources of electromagnetic waves (where the waves could initially be transmitted from one or more ground-based or space-based transmitters). In preferred embodiments, a fractal-based pattern or structure is used as a metasurface or metamaterial and incorporated as part of the small sat on some section or sections of the satellite's surface or structure. A fractal is a geometric pattern or structure that shows a common or substantially common motif over two or more size scales. These are the basis for fractal antennas, fractal resonators, and fractal metamaterials such as fractal plasmonic surfaces.

In accordance with embodiments of the present disclosure, metamaterials can be employed with satellites, e.g., small sats, to increase the observability of such satellites. Any type of suitable metamaterial can be used. In exemplary embodiments fractal-based patterns or structures may be used. In some embodiments, metamaterials such as those including split-ring resonators may be used, either by themselves or in conjunction with fractal-based resonators.

Fractal-based patterns or structures—those including fractal-based resonators—can have electrically large characteristics—while being physically small. When such patterns or structures (one or more) are applied to small sats, they can act as a "super scatterers" reflecting incident radiation, e.g., radar signals, thereby increasing the radar cross-section of the pattern or structure employed for the small sats. As a result, the radar cross-section at some frequencies or bands, exceeds the physical cross-section of the small sat. Put simply, when incorporating such a fractal-based structure or pattern on their surface or structure, these small sats, look larger (to radar, for example) than their actual size would dictate. This larger radar cross-section allows for reflection of more power back to the radar system (for example) receiver, thereby ensuring detection and monitoring of the small sat. Despite such a small sats small physical size, it is not "invisible" to radar because of the incorporation of the super scatterer. Such appropriately equipped small sats are thus detectable to ground-based radar systems to track and monitor their orbits, thereby solving the problem posed by the need to track the orbits of small sats.

For convenience, according to the present disclosure, such fractal-based superscatterer satellite reflectors may be referred to in shorthand as "FSR."

Exemplary embodiments utilize a fractal structure or pattern which has a prominent radar cross-section at the specific radar bands that are used to detect satellites in orbit. This is achieved by the fractals' ability to both control and multiplicatively produce reflective spectral passbands which can be chosen by the appropriate fractal pattern or patterns—e.g., by appropriate sizing of the individual cells—to essentially match those passbands used by the radar system.

Examples of suitable fractal resonators and scatterers that can be used in accordance with the present disclosure are disclosed in the Applicant's co-owned U.S. Patent Application Publication No. US2010/0156556 and U.S. Pat. No. 10,415,896; the entire content of each of which is incorporated herein by reference.

It will be appreciated that another embodiment of the invention is to take any satellite, whether or not a small satellite, or larger, and incorporate these fractal patterns or structures, thereby making the satellite appear larger than its actual size, to radar. It will also be appreciated that using said fractals, "metasurfaces," that may comprise fractal cells or resonators, for at least a portion of their extent, may also be used as these fractal superscatterer satellite reflectors. In some embodiments, metamaterials having non-fractal shaped resonators may be utilized as superscatters for scattering; these may be used with or without fractal cells or resonators. It will also be appreciated that versions and embodiments of the fractal pattern and or substrate of the superscatterer satellite reflector may be translucent or transparent (or may include transparent or translucent structure/material) to allow sunlight to go (pass) through and illuminate any solar cells or sensors underneath. It will also be appreciated that a version of the fractal superscatterer reflector may be designed to operate at visible light wavelengths, making it a brighter reflector of a light source impinging upon it, such as a LIDAR system.

FIG. 1 depicts an example of an FSR satellite system 100 in accordance with the present disclosure. As shown, system 100 includes a small sat cube satellite 102 in orbit about the Earth. Satellite 102 includes a fractal resonator surface 110 attached to part of one face, as shown. The fractal resonator surface no has a number of fractal resonators 112 disposed on or in substrate 114. In operation, the fractal resonator surface no acts as an FSR. In exemplary embodiments, the fractal resonator surface 110 can be configured as a rectangular panel 120, as shown.

While one fractal cell (or, equivalently termed, resonator) is depicted in FIG. 1, the fractal feature (110) can include (and does in preferred embodiments) an array or distribution of multiple fractal cells. Preferably at least some (but potentially all) of the fractal cells of fractal resonator surface no are the same size and shape. The fractal cells may be uniformly distributed over a surface in an array, and such a surface may be referred to as a fractal plasmonic surface (FPS). The fractal cells may be separated from each other (such that they do not directly physically touch one another) by a separation distance; such separation may be termed or regarded as lacking any galvanic connection or as galvanic separation or isolation. The separation distance is preferably smaller than an operational wavelength of the cells and/or surface. The separation may be, for example, $\frac{1}{10}$, $\frac{1}{12}$, $\frac{1}{16}$, or $\frac{1}{20}$ of an operational wavelength (lambda, $\lambda$) or approximately so. Other fractional values of lambda may of course be used and are included within the scope of the present disclosure. Moreover, embodiments of the present invention may use separations distances that are greater than lambda. Embodiments of the present disclosure may provide operation over a range of wavelengths; a separation distance can be used based on one of the wavelengths in such a range, e.g., a longest wavelength of the range, a shortest wavelength of the range, a mean-length wavelength of the range, etc.

Figure 2:
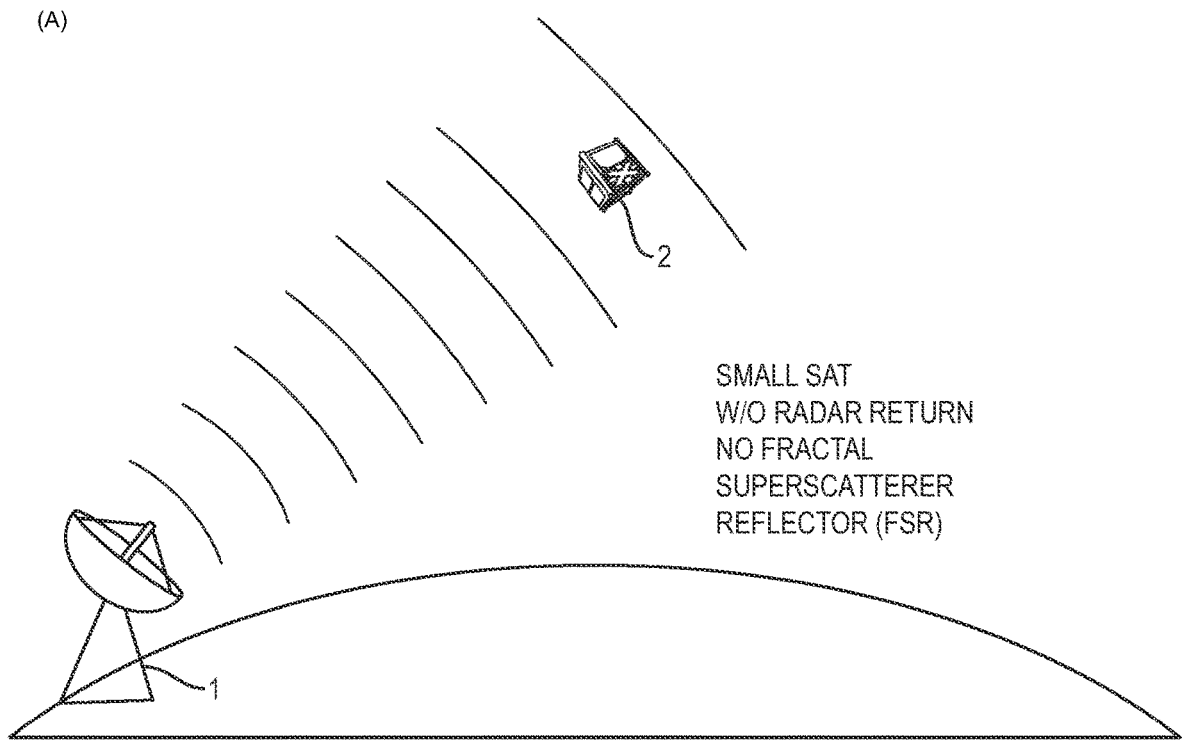
FIG. 2 depicts two small sats in different situations, (A)-(B), one satellite without an FSR (shown in A) and one satellite with an FSR (shown in B).
Figure 2:
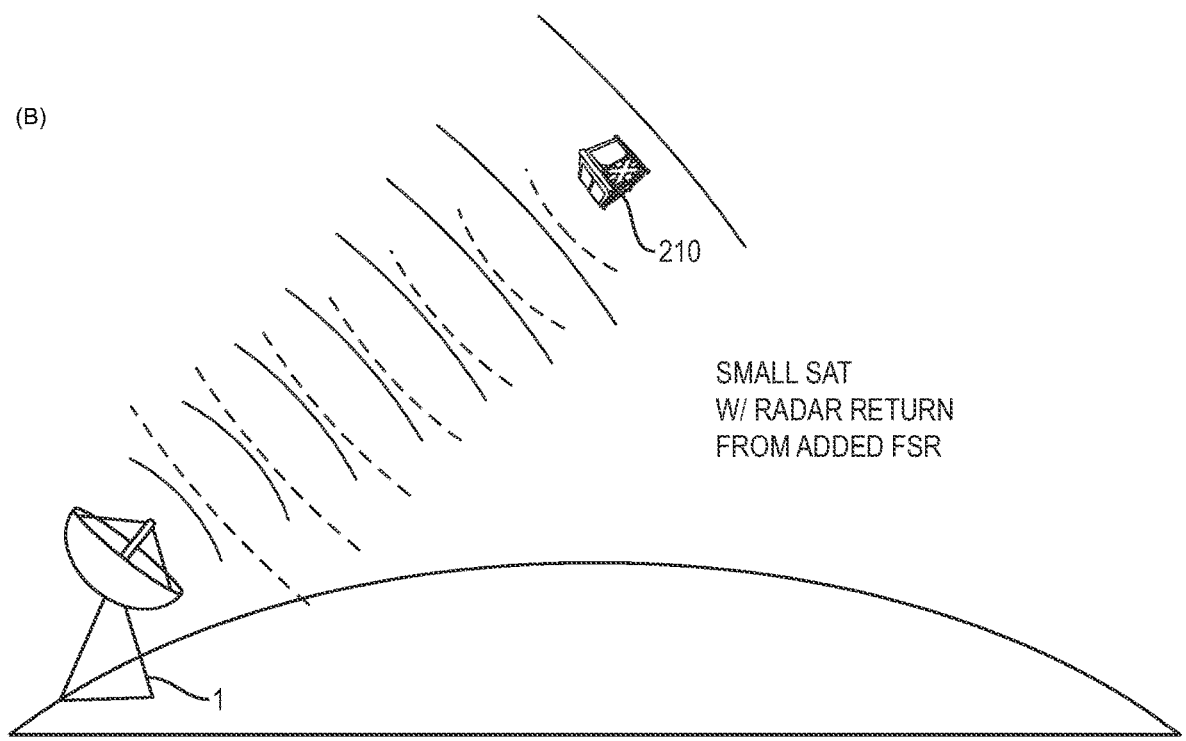

FIG. 2 depicts two small sats in different situations, (A)-(B), one satellite without a FSR (shown in A) and one satellite with a FSR (shown in B). In (A), a radar transmitter 1 is shown directing radar waves to a small sat 2; but because of the small size of the small sat, no discernable radar return (reflection) is detected at a receiver of the transmitter 1. In (B), under a similar orbital scenario, radar transmitter 1 directs radar pulses or wave to a small sat 210 that has an FSR. Because of the inclusion of the FSR, the satellite 210 produces a significant radar return (reflection) in response to the interrogation from the transmitter 1. Here, the radar signal bounces off the small sat 210 with its fractal superscatterer reflector and establishes (at the receiver) the existence of the small sat 210, its distance, speed, size, and orbital parameters. FIG. 2 thus depicts the enhanced scattering effect produced by an embodiment of the present disclosure—in which an FPS or fractal superscatterer is employed on/for a small sat and the small sat is made detectable or more detectable via the superscatterer, as shown.

Frequency "Tagging" of Satellites:

Another aspect of the present disclosure is directed to configuring a metasurface used for a satellite to provide the satellite with a unique "signature" such that the satellite can be distinguished from other satellites. This beneficial result can be achieved by designing the resonators of a superscatterer such that a unique reflection is produced when the superscatterer is interrogated with a known type of radiation, e.g., radar S band.

For example, in the fractal resonators used for a preferred superscatterer, a variety of resonances may be produced; the resonances may be selected by appropriate design of the resonator shape and sizes. In doing so the frequency or frequencies, whether narrow or broad in passband, may themselves be controlled in the radar reflection. As such it is thus possible to produce a unique spectral signature of enhanced radar reflections by choosing one or more fractal resonators and or fractal resonator layers. In other words, the enhanced radar reflection for the satellite will have a characteristic combination of bands or spectral features which can be used to uniquely tag a particular or given satellite. Essentially the meta-surface encodes frequency related spectral information which acts like a radar reflecting tag or license plate. The enhancement of radar RCS may be manifest at various moderate or narrow channels or bands, and the choice of the resonator shape(s), and or use of multiple layers, will determine the arrangement of said enhanced channels or bands, thereby encoding the RCS, much like a UPS symbol. The superscatterer (which may be referred to a "skin") thus can function as a unique ID for the satellite—by producing a unique radar reflection in response to a known radar interrogation, e.g., wavelength or pulse shape.

Figure 3:
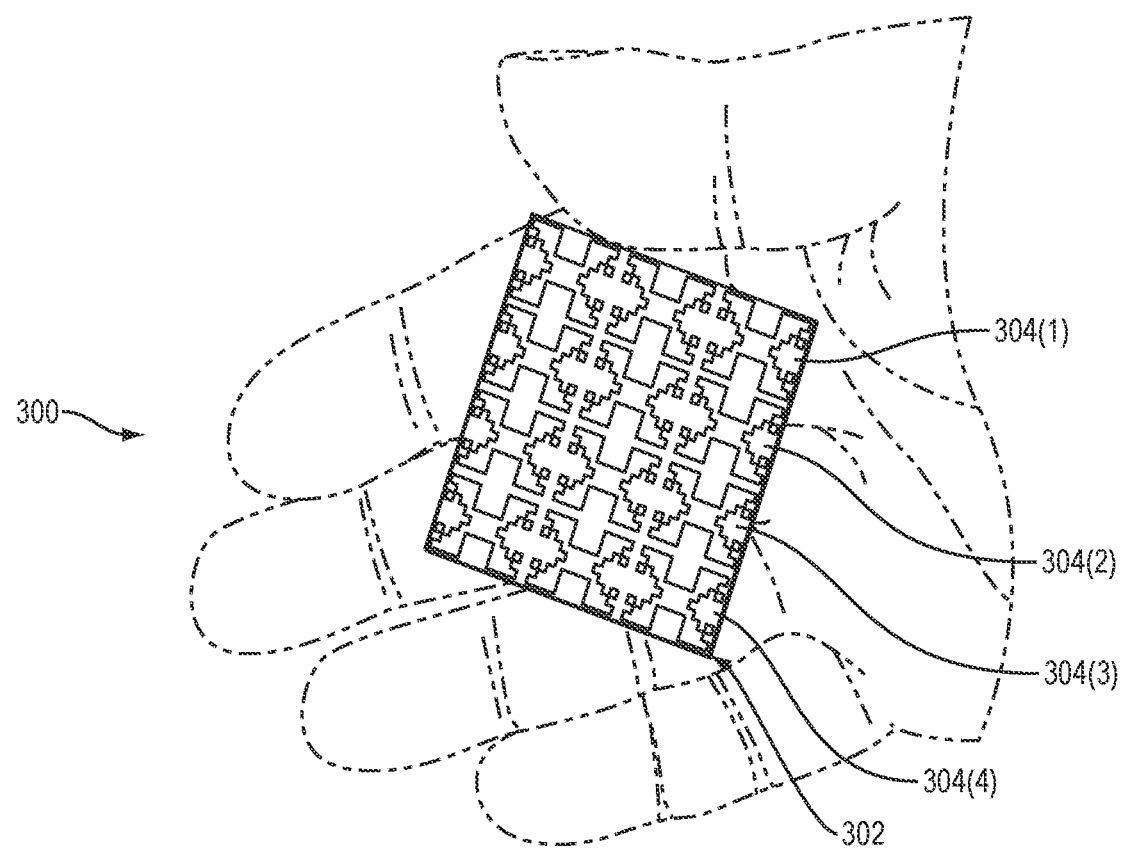
FIG. 3 depicts an example of an FSR surface in accordance with the present disclosure.

FIG. 3 depicts an example of an exemplary FSR 300 in accordance with the present disclosure. As shown, FSR 300 can include a substrate 302 on which are disposed a number of rows 304(L)-304(N) of fractal resonators 306. The resonators 306 can have a separation distance between them, as shown. In exemplary embodiments, the separation distance can be less than $1/10$, $1/12$, $1/16$, or $1/20$ of an operational wavelength (lambda, X) or approximately so. Example operational wavelengths can correspond (but are not limited to) those of the L band, S band, X band, Ku band, K band, Ka band, or C band, etc.

Application with Solar Cells:

A further aspect of the present disclosure is directed to and provides incorporation of a thin layer or layers of metasurfaces over solar cells used to power satellites. This layer(s) may be translucent or transparent to let sunlight (light with infrared, visible, and ultraviolet components) reach the solar cells. The resonators may be, but are not limited to, fractals (for at least a portion of their shape); further, the resonators used can include one or more types or shapes. These metasurfaces ("skins") may be used on other parts of the satellite while allowing sensors to able to see-thru them. Moreover, a satellite with such skins may use these skins are part of a satellite antenna system, either as a reflector or a driven element (array). Using a transparent or translucent substrate, such skins can be used to enhance detectability of small sats while allowing for the small sats to collect as much incident solar radiation as possible.

Figure 4:
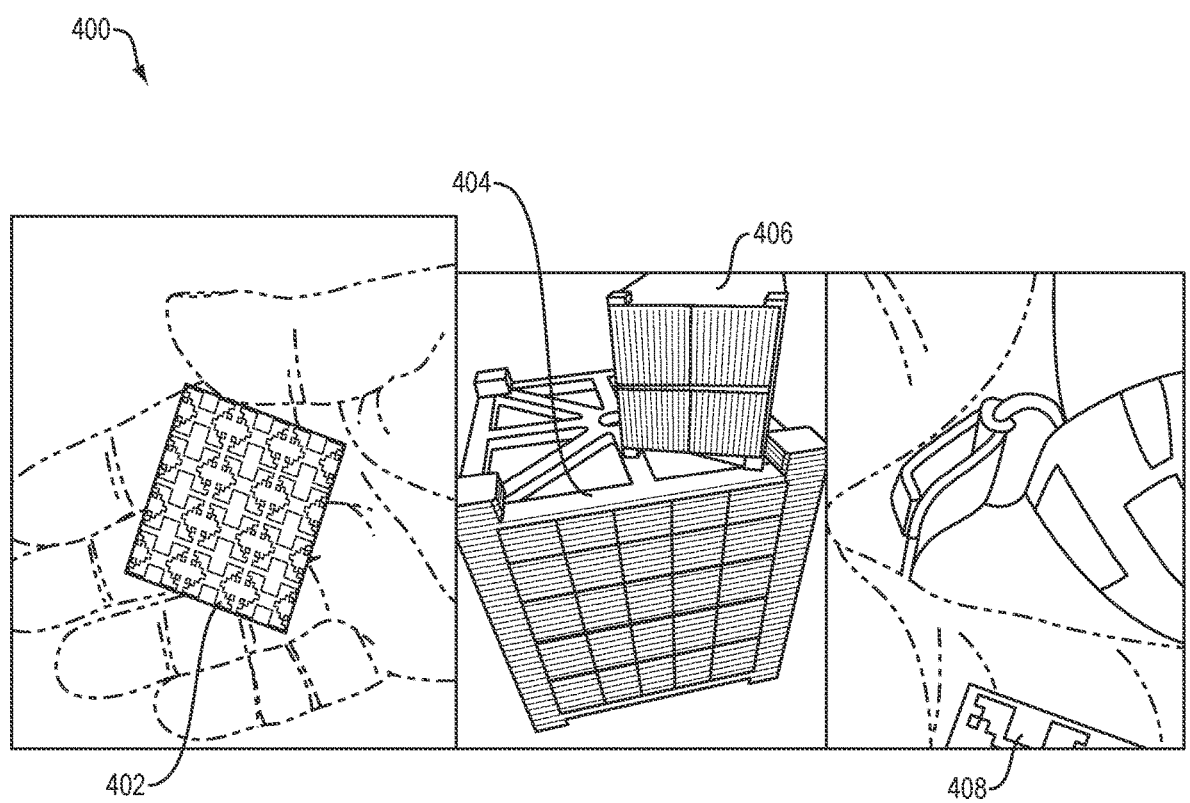
FIG. 4 depicts further examples of FSR surfaces and applications to small sats and cube sats in accordance with the present disclosure.

FIG. 4 shows various skins (note fractal resonators shown), and cube sats with their solar cells. As shown, the skins, e.g., skin 402, are preferably transparent (see-through) or translucent and can be layered and/or laminated onto these solar cells, e.g., 404 and 406. While certain fractal resonators are shown, e.g., 408, one of ordinary skill in the art will appreciate that others are possible and included within the scope of the present disclosure.

Accordingly, embodiments of the present disclosure can provide a numerous benefits and advantages. Embodiments of the present disclosure can provide novel systems for enhanced performance in radar reflection, particularly for small satellites. Enhanced wave-detection provided by such metamaterial reflectors can be used for interpretation, analysis and assessment, and data storage of the positions, orbits, ephemerides, and so on of satellites, particularly small sats. Embodiments of the present disclosure can provide satellites that incorporate the superscatterer reflectors and/or radar systems used in conjunction with satellites so equipped with the superscatterer reflectors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, while the foregoing description and accompanying drawings have been provided in the context of man-made satellites, the techniques of the present disclosure can be used with non-man-made objects, e.g., asteroids or smaller natural objects, etc.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Each article, patent, patent application, and other publication that has been cited in this disclosure is incorporated herein by reference in its respective entirety.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A satellite system comprising:
   a satellite body; and
   a metasurface disposed on a surface of the satellite body, wherein the metasurface includes a plurality of close-spaced resonators disposed on a substrate, wherein the resonators are spaced apart from one another by a separation distance such that they do not physically touch one another, and wherein the metasurface is operative to increases a radar cross section of the satellite at one or more specific frequencies or bands,
   wherein a resultant radar cross section of the plurality of close-spaced resonators disposed on the substrate as disposed on the surface of the satellite, resultant from incident energy at the one or more specific frequencies or bands, is larger than a resultant radar cross section of the substrate devoid of the plurality of close-spaced resonators; and
   wherein at least a portion of the substrate is transparent or translucent.

2. The satellite system of claim 1, wherein the plurality of spaced-apart resonators comprises a plurality of fractal cells.

3. The satellite system of claim 2, wherein each of the fractal cells includes a closed conductive path.

4. The satellite system of claim 1, further comprising a solar cell assembly, wherein the substrate is mounted on the solar cell assembly.

5. An orbital monitoring system comprising:
   a satellite body; and
   a metasurface disposed on a surface of the satellite body, wherein the metasurface includes a plurality of close-spaced resonators disposed on a substrate, wherein the resonators are spaced apart from one another by a separation distance such that they do not physically touch one another, and wherein the metasurface is operative to increases a radar cross section of the satellite at one or more specific frequencies or bands,
   wherein a resultant radar cross section of the plurality of close-spaced resonators disposed on the substrate as disposed on the surface of the satellite, resultant from incident energy at the one or more specific frequencies or bands, is larger than a resultant radar cross section of the substrate devoid of the plurality of close-spaced resonators; and
   a radar receiver operative to receive reflections from the metasurface, wherein the radar receiver is operative to detect the position of the satellite body;
   wherein at least a portion of the substrate is transparent or translucent.

6. The orbital monitoring system of claim 5, further comprising a solar cell assembly, wherein the substrate is mounted on the solar cell assembly.

7. The orbital monitoring system of claim 5, further comprising a radar transmitter operative to produce radar energy and direct it to the satellite body.

8. The orbital monitoring system of claim 5, wherein the plurality of spaced-apart resonators comprises a plurality of fractal cells.

9. The orbital monitoring system of claim 8, wherein each of the fractal cells includes a closed conductive path.

10. The orbital monitoring system of claim 5, wherein the metasurface is configured to provide a signature that can be used to identify the satellite body.

11. The orbital monitoring system of claim 10, wherein the signature comprises a radar cross section resulting from one or more reflections of electromagnetic energy incident on the metasurface.

12. The orbital monitoring system of claim 11, wherein the incident electromagnetic energy comprises an electromagnetic passband spectrum.

13. The orbital monitoring system of claim 5, wherein the radar receiver is operative to detect a spatial position of the satellite body.

14. The orbital monitoring system of claim 13, wherein the radar receiver is further configured to provide an indication of the distance, speed, size, and/or orbital parameters of the satellite body.

15. The orbital monitoring system of claim 13, wherein the spatial position is determined over several time intervals and a determination of an orbital ephemerid is calculated for the satellite body.

16. The orbital monitoring system of claim 15, wherein the radar receiver is further configured to produce future estimates of the satellite body spatial position at a defined future time or times based on the orbital ephemerid.

* * * * *